April 10, 1951 F. J. WOOD, JR 2,548,459
CUTTING APPARATUS
Filed Dec. 17, 1947 3 Sheets-Sheet 1
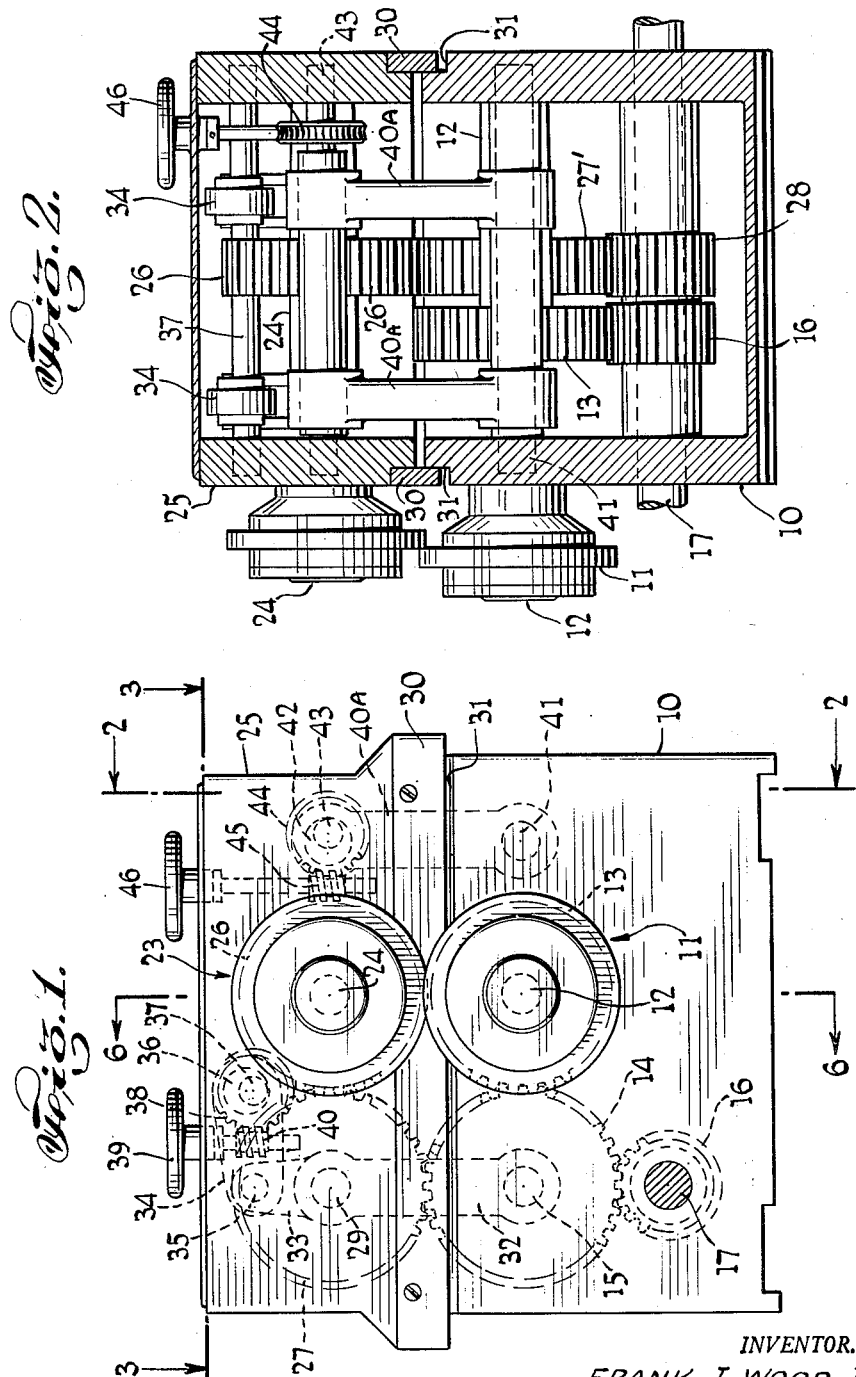
INVENTOR.
FRANK J. WOOD JR.
BY
Hammond & Littell
ATTORNEYS April 10, 1951  F. J. WOOD, JR  2,548,459
CUTTING APPARATUS Filed Dec. 17, 1947  3 Sheets-Sheet 2

INVENTOR.
FRANK J. WOOD JR.
BY
Hammond & Littell
ATTORNEYS

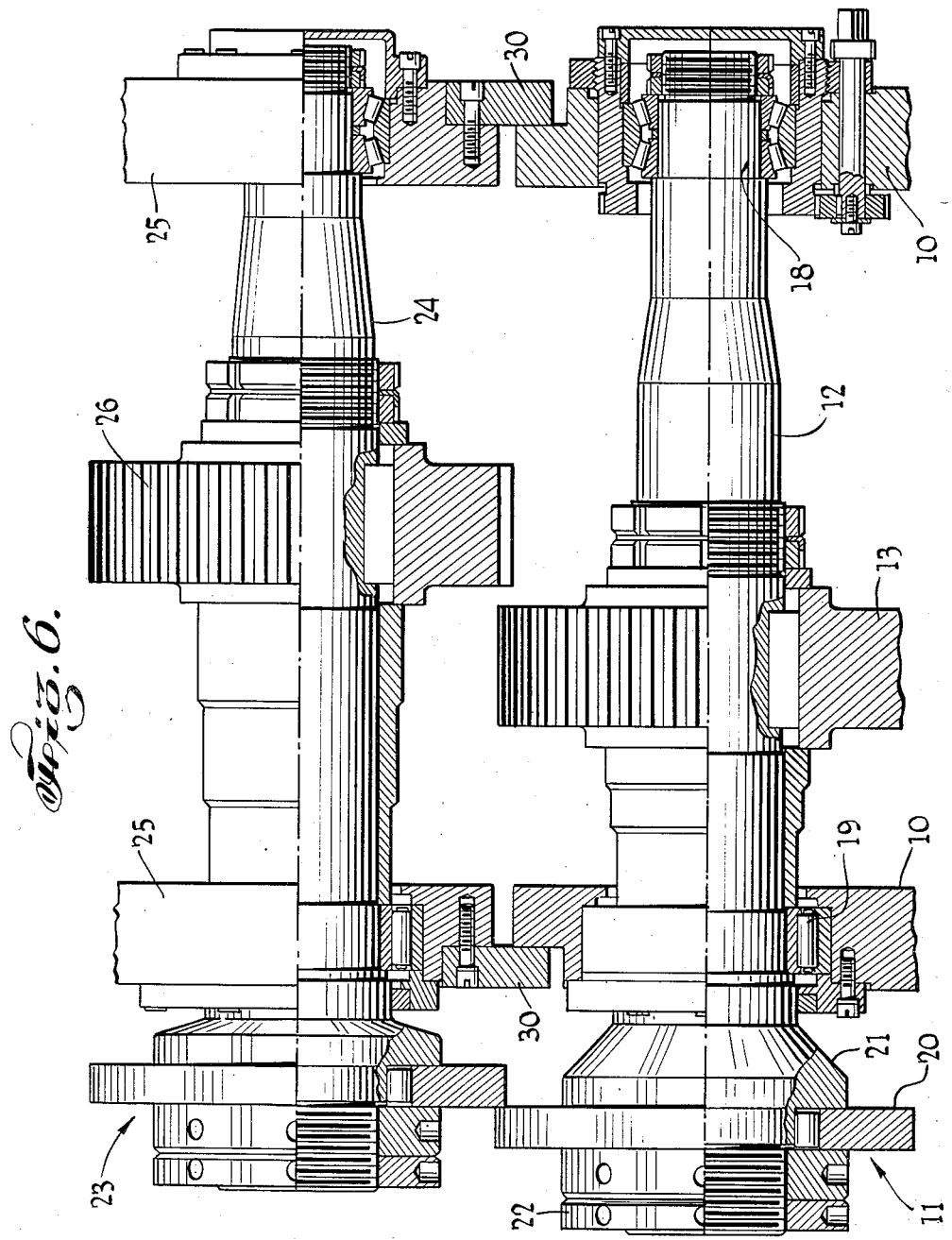

Patented Apr. 10, 1951

2,548,459

UNITED STATES PATENT OFFICE 2,548,459

CUTTING APPARATUS

Frank J. Wood, Jr., New Rochelle, N. Y., assignor to Erwin Loewy, New York, N. Y.

Application December 17, 1947, Serial No. 792,196

9 Claims. (Cl. 164—60)

This invention relates to apparatus for slitting or operating on sheet material and particularly mechanism for adjusting the relative positions of the rotary cutters thereof or the like.

In the cutting of sheet material by means of rotary cutters, two circular discs normally are employed, the discs having hardened metal surfaces and being arranged so that the surfaces thereof overlap to exert a shearing or cutting action on sheet material as it is fed between the rotary cutters, said rotary cutters being positively driven through a gear system or other drive mechanism. It is desirable to be able to control both the distance between the centers of the cutters, which governs the overlap of the surfaces thereof, and also the angle between the line joining the centers of the cutters and the direction of feed of the material between the cutters. For convenience, this last angle may be called the work entry angle. As an example of the work entry angle adjustment, it may be desirable to have the work fed into the cutters at an angle of 90° to the line joining the centers of the cutters, or it may be desirable to have the work fed at a different angle into the cutters.

Difficulties are involved in properly arranging the support of the parts of a slitter of the character described herein because of the large stresses present when material is being cut. It is necessary that the supporting structure for the cutters be designed to hold the cutters accurately in any desired adjusted position relative to each other.

One of the objects of the present invention is to provide an improved adjustment means for a rotary cutter slitter arrangement which will permit ready adjustment of the cutters in a plurality of directions.

Another of the objects of the invention is to provide a construction wherein adjustments can be made of the relative position of the cutters without disconnecting the drive to said cutters.

In one aspect of the invention, the cutters can be held by frame portions, the frame portions having a connecting mechanism which can be adjusted to hold said cutters in a plurality of positions relative to each other as is desired. In addition to allowing for the adjustment of the cutters relative to each other, the frame portions also can be arranged in such a manner as to hold the driving mechanism for the cutters in engagement at all times, which also may include while the frame portions and cutters are being adjusted.

One manner of carrying out the invention is to use a pair of frames or supporting portions, each of the portions rotatably carrying one of the cutters. The frames are connected together by means of mechanisms, one connecting link mechanism being adjustable to move the frames relative to each other in one direction or aspect and the other connecting link mechanism being adjustable to move the frames relative to each other in a direction or aspect differing from that caused by adjustment of the first connecting link mechanism.

One of the features of the invention is the use of a lower frame or box carrying the gearing or driving mechanism and the lowermost cutter in conjunction with an upper frame structure having an upper rotary cutter mounted therein driven by gears or driving mechanism meshing with the driving mechanism of the lower frame. It is to be understood that the terms "upper" and "lower" are merely relative in referring to the particular arrangement of the cutters.

One of the link mechanisms extending between the frames is arranged to hold one of the gears in the lower frame in mesh at all times with one of the gears in the upper frame. This can be accomplished by having one of the pivots of the link mechanism substantially co-axial with the axis of the gear of the lower frame and the other pivot of the link substantially co-axial with the axis of the interengaged gear of the upper frame. The link mechanism can be arranged so that it may be moved positively angularly relative to one of the frames about the axis of the gear of said frame. In this manner, the angular position of the link relative to both frames will be moved, causing the frames to move relative to each other in one direction and thus there will be a displacement of the center of the upper gear relative to the center of the lower gear and, at the same time, the gears will be held in engagement with each other. A second link pivotally joining the two frames can be provided which may be arranged so that its effective length can be changed so as to adjust the overlap of the cutters relative to each other, the frames pivoting about the centers of the first-mentioned link mechanism.

These and other objects, advantages and features of the invention will become apparent from the following description and drawings which are merely exemplary, it being evident that the invention can be applied to devices other than cutters.

In the drawings:

Fig. 1 is a front elevation of one form of the invention.

Fig. 2 is a sectional view taken along the line 2—2 of Fig. 1.

Fig. 6 is a detailed view of the gear shafts taken along the line 6—6 of Fig. 1, portions of the gears and other elements being broken for purposes of illustration.

Figure 4:
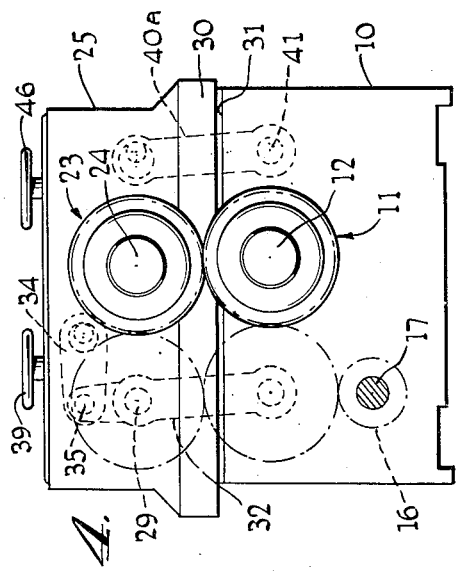
Fig. 4 is a front view of the device of Fig. 1 showing the horizontal movement links adjusted so that the upper cutter is moved to the left relative to the lower cutter.

In a preferred form of the invention, lower frame 10 has lower cutter or slitter 11 mounted thereon, said cutter being carried by shaft 12 (Figs. 1, 2). Shaft 12 is driven by gear 13 mounted thereon, said gear in turn being driven by gear 14 (Fig. 1) mounted on shaft 15. Gear 14 is driven by gear 16 carried on drive shaft 17. It is thus seen that slitter 11 is driven through the gear train including gear 16, gear 14 and gear 13.

Shaft 12 carrying the lower cutter 11 can be carried in the roller bearings 18 and 19 (Fig. 6), said roller bearings being suitably mounted in the lower frame 10. In the form shown, roller bearing 18 serves as a thrust bearing to keep the shaft in its horizontal position. Gear 13 can be suitably mounted on shaft 12 and the lower slitter or cutter 11 can have any desired construction, such as the one shown wherein the circular disc 20 is mounted on hub 21 by means of lock nuts 22.

Figure 3:
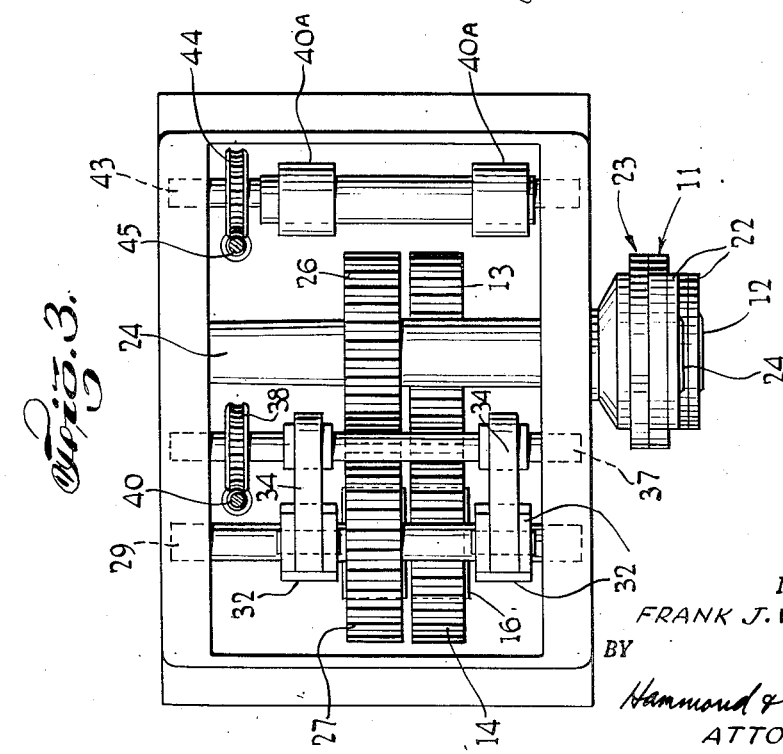
Fig. 3 is a sectional view taken approximately along the line 3—3 of Fig. 1.

The upper slitter 23 is carried on shaft 24 mounted in the walls of the upper frame 25. The upper slitter 23 is driven by means of gear 26 mounted on shaft 24, said gear 26 meshing with gear 27 (Figs. 1, 3), gear 27 meshing with gear 27' carried in the lower frame 10, said gears 27' and 28 being maintained in engagement at all times as will be explained hereafter. Gear 27' is driven by gear 28 mounted on drive shaft 17. It is apparent that the drive for upper slitter 23 is from gear 28 (Fig. 2), gear 27' carried in the lower frame, gear 27 carried on shaft 29 journalled in the upper frame 25, and gear 26. Upon rotation of the driven shaft 17, the two cutters will rotate relative to each other through the described gear train.

The upper frame 25 may have side guide plates 30 mounted thereon, said guide plates engaging guideways or longitudinally extending notches 31 cut in the sides of the lower frame 10. The guide plates in conjunction with said notch will serve to guide the movement of the upper frame 25 longitudinally relative to the lower frame 10.

The frames are held in position relative to each other by the two link mechanisms in a manner about to be described. Each of links 32 (Figs. 1, 3) of one of the link mechanisms has one end journalled on the lower shaft 15, and the upper end of each of these links is journalled on shaft 29. The links could be journalled on surfaces other than the shafts, providing the axis thereof substantially coincides with the respective shaft axis. An extension 33 from each of links 32 is provided with a connector 34 pivoted thereto at 35 for the purpose of adjusting the position of the links relative to the upper frame about the axis of shaft 29 so as to change the angular position of the links 32 relative to the upper frame 25 and thus the horizontal relationship between the upper and lower frames. A pair of eccentrics 36 can be provided on a shaft 37, said eccentrics being engaged in suitable apertures 38 at the right-hand end of links 34 (Fig. 1). Shaft 37 can be turned by means of adjusting handwheel 39 and worm gear 40 so as to move the links 34 longitudinally relative to the upper frame 25. When such is done, the angular position of the link 32 relative to the upper support about the axis of shaft 29 will be changed and thus move the upper frame relative to the lower frame, link 40A permitting the movement.

As can be seen in Fig. 1, the center of eccentric 37 is substantially vertically disposed relative to the center of aperture 38 of connector 34 so that the line joining the centers of shafts 15 and 29 is substantially vertical. When the shaft 37 is turned to the position of Fig. 4, connector 34 will be moved to the left and the link 32 rotated about shaft 29 as a center, so that upper frame 25 is moved to the left relative to the lower frame 10. By such a movement, the upper cutter 23 is moved to the left relative to lower cutter 11, so that the work entry angle or the angle between the line joining the centers of the cutters and the line of advance of work fed therebetween can be changed.

Figure 5:
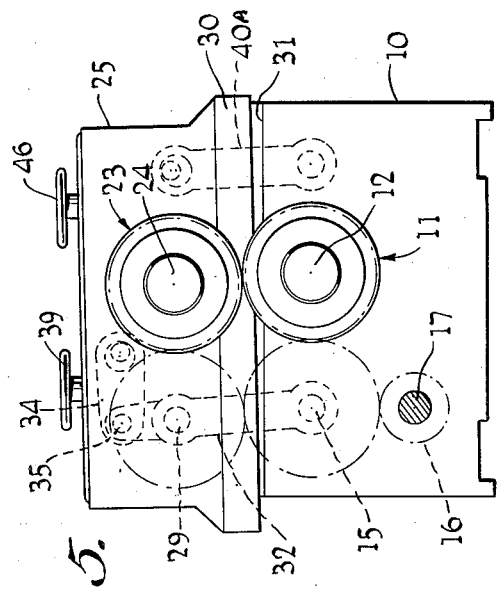
Fig. 5 is similar to Fig. 4 with the exception that the upper support has been pivoted by the overlap adjustment so as to decrease the overlap of the cutters as compared to Fig. 4.

A pair of height or overlap adjusting links 40A (Figs. 1, 2) connecting the upper and lower frame members together are provided. The lower ends of these links are pivoted on shaft 41 and the upper ends are carried on eccentrics 42 mounted on shaft 43. Shaft 43 has a worm wheel or gear 44 mounted thereon and a worm 45 engaged with gear 44, said worm 45 being operable by means of handwheel 46. As seen in Fig. 1, the center of shaft 43 is substantially horizontally disposed relative to the center of eccentric 42 so as to be in a neutral position. If it is desired to change the overlap of the cutters, handwheel 46 may be turned so as to place the eccentric into the relative position shown in Fig. 5 to increase the effective lengths of the links 40A or to elevate the right-hand end of the upper frame 25 relative to the lower frame 10, such a pivoting action being possible because of the pivotal mounting of the links 32 on shaft 29 and shaft 15. It is apparent that movement of the link adjustment means 46 or change in link mechanism 40A causes an angular movement of the two frames relative to each other so as to change the overlap relationship of the cutters.

By the use of the handwheels 39 and 46, it is apparent that the horizontal position of the cutters relative to each other can be adjusted and the overlap adjusted. The guides 30 will maintain the crosswise relationship of the frames and cutters relative to each other although other mechanism can be used to maintain correct alignment of the cutters.

The horizontal or parallel movement of the frames relative to each other when link mechanism 32 is adjusted has as its primary purpose the adjustment of the angle of entry of the work to the cutters, although there might also be some change of overlap depending upon the relation and design of the connecting link mechanism. The angular movement of the frames relative to each other by change of the effective length of the links 40A has as its primary object the adjustment of the overlap of the cutters.

Various arrangements and designs of link mechanism can be employed and it is not necessarily limited to that shown. Also various adjusting means can be employed in place of the eccentric arrangement disclosed, and the eccentric adjusting means could be placed on the lower frame instead of the upper frame.

It is apparent that various modifications in the details of construction can be made without departing from the spirit of the invention except as defined in the appended claims.

What is claimed:

1. In a rotary cutter shear or the like having a pair of cooperating rotary cutters, the combination comprising cutter supporting frames, driving mechanism connected to said cutters and carried in said frames, frame positioning means including frame connecting means adjustable in one direction varying the overlap of said cutters and a second frame connecting means adjustable in a second direction varying the work entry angle to the cutters, said positioning means being constructed and arranged to maintain said driving mechanism connected to said cutters in all adjusted positions of said cutters relative to each other.

2. In a rotary cutter shear or the like having a pair of cooperating rotary cutters, the combination comprising a pair of frames rotatably supporting said cutters and movable relative to each other in a plurality of directions, adjustable frame connecting means joining said frames and movable to adjust said frames relative to each other in one direction varying the overlap of said cutters, and a second frame connecting means joining said frames and adjustable in a direction differing from the first-mentioned direction varying the work entry angle of the cutters relative to each other.

3. In a rotary cutter shear or the like having a pair of cooperating rotary cutters, the combination comprising a first frame rotatably carrying one of said cutters, a second frame rotatably carrying the other of said cutters, a first connecting link means between said frames adjustably movable relative to one of said frames so as to change the relationship of said frames and cutters in one direction relative to each other, and a second connecting link means spaced from said first connecting link means and adjustably movable so as to vary the relationship of said frames and cutters in a direction differing from the movement caused by adjustment of the first connecting link means.

4. In a rotary cutter shear or the like having a pair of cooperating rotary cutters, the combination comprising a pair of frames rotatably supporting said cutters and movable relative to each other in a plurality of directions, a connecting link mechanism pivotally mounted on each of said frames, a second connecting link mechanism pivotally mounted on each of said frames, means connected to one of said link mechanisms operable to change the angular relationship of one of said link mechanisms with said frames, and means connected to the other link mechanism operable to change the effective length thereof, whereby said cutters may be adjusted relative to each other.

5. In a rotary cutter shear or the like having a pair of cooperating cutters, the combination comprising a pair of frames rotatably supporting said cutters and movable relative to each other, a shaft in each frame having gears on each shaft in interengagement with each other, a drive mechanism in one frame connected with said gears, a link mechanism pivoted along the axis of each shaft on each frame maintaining said gears in engagement at all times, means adjusting the angular relationship of said link mechanism to said frames to move said frames and cutters relative to each other, and drive connections between said gears and drive mechanism with said cutters.

6. In a rotary cutter shear or the like having a pair of cooperating cutters, the combination comprising a pair of frames rotatably supporting said cutters and movable relative to each other, a shaft in each frame, driving gears on each shaft in engagement with each other, a link mechanism pivoted at the axis of each shaft on each frame maintaining said gears in engagement at all times, means adjusting the angular relationship of said link mechanism relative to said frames to move said frames and cutters relative to each other, drive connections between said gears and said cutters, a second connecting link mechanism pivotally mounted on each frame, and an effective link length adjusting means connected with said second link mechanism.

7. In a rotary cutter shear or the like having a pair of cooperating rotary cutters, the combination comprising a pair of frames rotatably supporting said cutters and movable relative to each other in a plurality of directions, a connecting link mechanism pivotally mounted on each of said frames, a second connecting link mechanism pivotally mounted on each of said frames, an eccentric means mounted on one of said frames connected to one of said link mechanisms operable to change the angular relationship of one of said link mechanisms with said frames, and eccentric means mounted on one of said frames connected to the other link mechanism operable to change the effective length thereof and adjust the overlap of the cutters, whereby said cutters may be adjusted relative to each other.

8. In a rotary cutter shear or the like having a pair of cooperating rotary cutters, the combination comprising cutter supporting frames, driving mechanism connected to said cutters and carried in said frames, frame positioning means adjustable to move said frames substantially linearly relative to each other and the direction of travel of the material to be cut so as to vary the work entry angle and frame positioning means moving said frames angularly relative to each other for varying the overlap of said cutters relative to each other, said positioning means being constructed and arranged to maintain said driving mechanism connected to said cutters in all adjusted positions of said cutters relative to each other, and means on said frames maintaining said cutters in axial relationship regardless of movement of said frames relative to each other.

9. In a rotary cutter shear or the like having a pair of cooperating rotary cutters, the combination comprising a first frame rotatably carrying one of said cutters, a second frame rotatably carrying the other of said cutters, a first connecting means having a pair of spaced links pivotally connected to said frames and adjustably movable relative to one of said frames so as to change the relationship of said frames and cutters in one direction relative to each other, and a second connecting means having spaced links, said second connecting means being spaced from said first connecting means, said second connecting means having mechanism connected therewith adapted to change the effective length thereof so as to vary the relationship of said frames and cutters in a direction differing from the movement caused by adjustment of the first connecting link means.

FRANK J. WOOD, Jr.

REFERENCES CITED

The following references are of record in the file of this patent:

UNITED STATES PATENTS

| Number | Name | Date |
| --- | --- | --- |
| 761,225 | Ham | May 31, 1904 |
| 1,461,266 | Cameron et al. | July 10, 1923 |
| 1,819,635 | Biggert et al. | Aug. 18, 1931 |